United States Patent [19]

Sibeud

[11] Patent Number: 4,790,212
[45] Date of Patent: Dec. 13, 1988

[54] ENGINE BRAKE CLUTCH INCLUDING ELECTRICAL BRAKE

[75] Inventor: Jean-Paul Sibeud, Saint Symphorien d3 Ozon Lyon, France

[73] Assignee: Renault Vehicules Industriels, Lyons, France

[21] Appl. No.: 939,066

[22] Filed: Dec. 8, 1986

[30] Foreign Application Priority Data

Dec. 6, 1985 [FR] France ............................ 85 18061

[51] Int. Cl.[4] .................... F16H 1/44; F16D 67/02; H02K 49/04
[52] U.S. Cl. .................... 74/710.5; 192/13 R; 310/76; 310/102 R
[58] Field of Search ............. 192/13 R, 20; 74/713, 74/710.5, 665 GB, 700; 310/76, 78, 92, 96, 99, 102

[56] References Cited

U.S. PATENT DOCUMENTS

| | | | |
|---|---|---|---|
| 1,893,346 | 1/1933 | Winther et al. | 310/96 |
| 1,952,450 | 3/1934 | McCormick | 310/99 X |
| 2,790,917 | 4/1957 | Trofimov | 310/102 R |
| 4,097,752 | 6/1978 | Wulf et al. | 290/20 |

Primary Examiner—Leslie A. Braun
Assistant Examiner—Richard M. Lorence
Attorney, Agent, or Firm—Oblon, Fisher, Spivak, McClelland & Maier

[57] ABSTRACT

Engine brake clutch device comprising a common system of the electric machine type for transformation of mechanical energy associated with a differential system (27) and with a clutch (28), the unit being placed between the engine and the transmission so as to be able to perform the clutching or the engine braking of the vehicle.

6 Claims, 1 Drawing Sheet

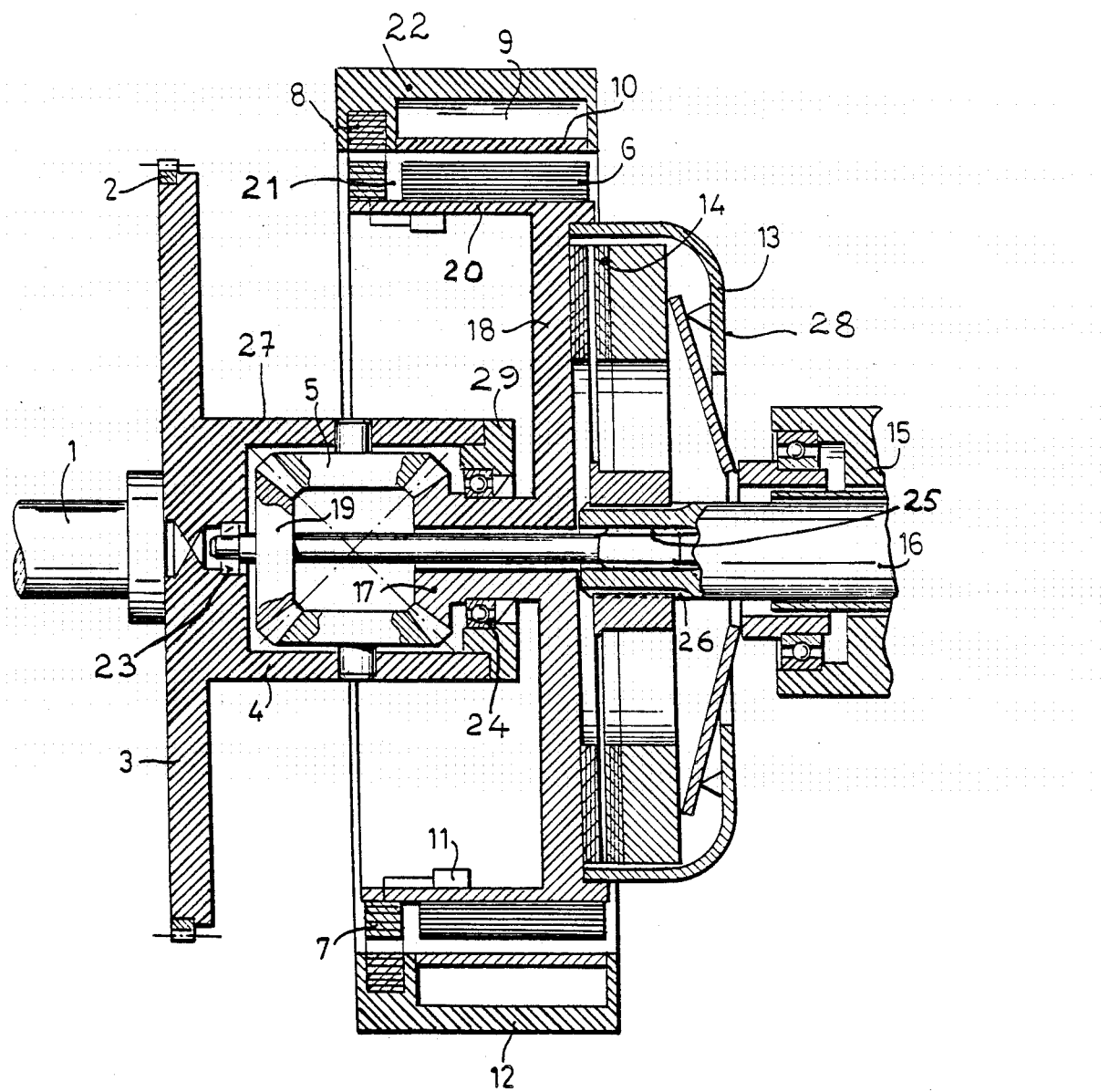

ENGINE BRAKE CLUTCH INCLUDING ELECTRICAL BRAKE

BACKGROUND OF THE INVENTION

The invention relates to an engine brake clutch device placed between an engine and a transmission and which is mounted particularly on a commercial vehicle to assure both the clutch function and the engine brake function.

The introduction of supercharged diesel engines poses two new problems in comparison with the atmospheric intake diesel engine.

The first problem relates to the clutch. The supercharged diesel engine, starting from its vacuum operation at idle, is able to provide its maximum torque only after a certain time and after having delivered a certain amount of energy, that must be dissipated in the clutch in the case of a uphill start of the vehicle. This greatly restricts the standard friction clutches in their service life.

The second problem relates to the braking of the vehicle. The supercharged diesel engine provides the same power as an atmospheric engine of much greater capacity. Consequently, the ratio of the engine torque to the braking torque is much higher for a supercharged diesel engine than for an atmospheric diesel engine. The supercharged engine holds the vehicle back much less than the atmospheric engine and the use of an engine brake becomes essential with a supercharged engine.

These two problems are poorly solved by prior art methods. Actually, with the atmospheric intake diesel engines whose engine torque was immediately available at low speed, the friction clutch made it possible to obtain good results with a satisfactory reliability. The atmospheric intake diesel engine equipped with an exhaust brake offered a satisfactory engine braking. However these prior art solutions no longer apply both to the supercharged engines and to the increase in the level of mechanization of the commercial vehicles.

In prior art systems as the clutch degrades, for a time, an amount of energy that it stores in its thermal inertia and evacuates slowly in the periods when, closed, it does not dissipate. A conventional clutch is designed for a sporadic and not extended use. If it is used continuously it is destroyed. The known engine brakes are provided to dissipate the energy for longer periods than a clutch and because of this possess a system for dissipation of the energy which in certain cases alters the efficiency of the vehicle.

OBJECTS OF THE INVENTION

The aim of this invention is to propose a single device which provids both the clutch and engine brake functions of a vehicle under conditions of sufficient reliability while assuring a high level of efficiency of the vehicle.

This is obtained by associating a differential, an electric machine and a clutch which acts as a bridging clutch.

According to an embodiment of this invention, the engine brake clutch device comprises a system of transformation of mechanical energy associated with a clutch, the unit being placed between the engine and the transmission of the vehicle, so as to be able to perform the clutching or the engine braking of said vehicle. The association of the system of transformation of energy with the clutch is made by means of a differential system, and the system of transformation of mechanical energy consists of an electric machine.

According to one embodiment of the invention, a control device works with the electric machine, said device being of the computer type.

According to one embodiment of the invention, the electric machine is an eddy-current brake.

According to another embodiment of the invention, the electric machine is an alternator.

According to an embodiment of the invention, the differential system has a housing, which carries the planet pinions, and, which is driven by the engine. This differential has as sun gear which is connected directly to the transmission input shaft. The other sun gear of the differential is connected to the electric machine by means of a clutch plate. This clutch plate can be joined with the transmission input shaft by means of the clutch.

According to one embodiment of the invention, the eddy-current brake comprises:
- an excitation alternator with an inductor mounted in a stator and an armature mounted in a rotor with a rectifier, which is fed by said armature;
- an inductor mounted in the rotor and fed by said rectifier;
- an armature mounted in the stator and associated with a cooling water circulation chamber.

According to one embodiment of the invention, the alternator comprises:
- an excitation alternator with an inductor mounted in a stator and an armature mounted in a rotor with a rectifier, which is fed by said armature;
- an inductor mounted in the rotor and fed by said rectifier;
- an armature mounted in the stator.

According to one embodiment of the invention, the computer acts on the current feeding the inductor of the excitation alternator.

The engine brake clutch device according to the invention thus exhibits the advantage of achieving a synergy between these two different functions of the vehicle by the use of a common element of dissipation or of transformation of mechanical energy.

The electric machine transforms the mechanical energy into either thermal energy that is dissipation in the cooling system of the engine when it is acting as an eddy-current brake, or else into electric energy that can be used elsewhere when it is acting as an alternator.

The differential makes it possible to introduce the electric machine between the engine and the transmission of the vehicle when it is desired to obtain a coupling with slipping.

The bridging clutch makes it possible to eliminate any slipping of the transmission by locking the differential. The electric machine then becomes joined with the transmission can serve as engine brake.

The passage from one operation to another is assured by a controlling computer without which the use of the device described would require complex operations that the driver would have to perform tediously and with difficulty.

BRIEF DESCRIPTION OF THE DRAWINGS

Other characteristics and advantages of this invention will come out from the following description of the embodiment given by way of examples with reference to the accompanying drawings in which:

FIG. 1 is a diagrammatic view in section of the device according to the invention.

DETAILED DESCRIPTION OF THE DRAWINGS

Crankshaft 1 of the thermal engine 100 is connected to a flywheel 3 equipped with a starter ring gear 2 and with a differential housing 4 which carries planet pinions 5 of the differential referenced 27 in its entirety.

A sun gear 19 of differential 27 drives the output shaft of the system, which is also transmission input shaft 16 of transmission 102, by means of grooves 25.

Shaft 16 carries clutch driven plate 14 which is connected by grooves 26 to said shaft 16.

Sun gear 19 is carried, at the other end, by a bearing 23 which is mounted in housing 4 of differential 27.

The other sun gear 17 of differential 27 is mounted in housing 4 by a bearing 24 housed in a cover 29.

Sun gear 17 drives a clutch plate 18 which is extended by a ring gear 20, and which can be made solid with transmission input shaft 16 by means of the clutch referenced 28 in its entirety.

Ring gear 20 carries rotor unit 21 of the electric machine.

Stator unit 22 of the electric machine is mounted on a connecting element 12 and placed between the clutch housing and the engine housing.

The electric machine can be an eddy-current brake or an alternator.

The eddy-current brake comprises:
an excitation alternator with an inductor 8 mounted in stator 22 and an armature 7 mounted in rotor 21 with a rectifier 11, which is fed by said armature 7;
an inductor 6 mounted in rotor 21 and fed by said rectifier 11;
an armature 10 which is a wall mounted in stator 22 and associated with a chamber 9 for circulating cooling water.

The alternator comprises:
an excitation alternator with an inductor 8 mounted in stator 22 and an armature 7 mounted in rotor 21 with a rectifier 11, which is fed by said armature 7;
an inductor 6 mounted in rotor 21 and fed by said rectifier 11;
an armature mounted in stator 22.

Sun gear 17 drives:
clutch plate 18;
clutch mechanism 13;
the inductor 6 of the eddy-current brake or alternator;
the armature of excitation alternator 7;
the pole rectifiers of inductor 11.

Connecting element 12 between the clutch housing and the engine housing carries inductor 8 of the excitation alternator and a chamber 9 for circulating cooling water whose wall 10 opposite inductor 6 is the seat of the eddy currents. This water circulation chamber can be replaced by an alternator stator armature in case the braking machine is an alternator making it possible to transform the braked mechanical energy into usable electric energy.

Clutch 13 is controlled by a conventional stop 15.

If the vehicle travels normally, clutch 13 is closed and the differential inoperative, input shaft 16 rotates at the speed of crankshaft 1. The engine torque is integrally transmitted.

If a current is injected into inductor 8 of the excitation alternator, rectifier 11, the poles of inductor 6 of the eddy-current brake or of the alternator are excited by armature 7. This produces an absorption of energy in the transmission. In the case of the eddy-current brake, this energy is dissipated into heat and evacuated to the cooling system of the engine by water circulating in chamber 9.

In the case of an alternator, electric energy is available for any use.

In both cases, the system functions as an engine brake and can control the engine braking by acting on the intensity of the current injected into inductor 8 by a control device 104 of the computer type.

The device according to the invention using an excitation alternator has several advantages:
through appropriate design choices the machines, the response times can be short;
the excitation energy is taken from the shaft that it is desired to brake; it contributes to the desired effect and especially is not taken from a source which will reduce fuel efficiency;
use is not made of sliding contacts to bring the excitation energy to the rotor.

First the operation of the device when the vehicle is stopped with the transmission in neutral will be described.

To engage a gear, firstor reverse, it is necessary to prevent shaft 16 from rotating. To do this, the following initial procedure is used:
clutch 13 is closed;
the engine is accelerated to two times its idling speed;
clutch 13 is opened and the unit connected to sun gear 17 continues to rotate at two times the idling speed on its inertia;
the engine speed is allowed to return to idling.

When the engine speed reaches idling, the speed of shaft 16 is reduced to zero due to the greater inertia of the structure connected to the sun gear; and a gear can be engaged.

This procedure, difficult for a human operator, is very easy for an appropriately programmed computer.

The operation of the device during the starting of the vehicle when level or on a medium slope will now be described.

Clutch 13 is open.

When a gear is engaged, and the vehicle stopped, the speed of transmission input shaft 16 is zero, the speed of crankshaft 1 is the idling speed and sun gear 17 rotates.

The starting procedure is obtained by action of a computer which measures the speed of sun gear 17 and causes it to remain less than or equal to a certain speed, for example twice that of the idling speed. This is achieved by an action of the computer on the excitation of the eddy-current brake so that it develops a braking torque suited to the desired objective.

If the driver accelerates the engine, the engine speed will become greater than the idling speed, but the computer controls the eddy current brake to prevent sun gear 17 from accelerating which will cause a transfer by the differential of the increase in the engine speed to an increase in the speed of sun gear 19, i.e., shaft 16, i.e., the starting of the vehicle.

When the speeds of shaft 1 and sun gears 17 and 19 are equal, clutch 13 can be closed and the starting will be automatically completed without the clutch being required to dissipate energy, its role being to bridge parts rotating in the same direction and at the same speed.

The device according to the invention thus exhibits the following advantages:

the starting torque is determined at will by the driver;
the energy is dissipated by the eddy-current brake in the cooling water of the engine or in a specialized circuit if an alternator is used instead of the eddy-current brake.

Therefore, there is no wear and this starting torque converter can be used as much as necessary and in particular the supercharged operation of the engine can be reached.

The torque transmitted during the starting is only half the engine torque. When the bridging clutch is closed, the total engine torque can become availale when the torque of the eddy-current brake is reduced to zero. This can be obtained with a sufficient gradualness to avoid jolting.

Let us examine the operation of the device during starting on a steep hill.

The previously described procedure will not make it possible for the engine to accelerate if the torque necessary for starting is greater than half of what the engine can produce if this condition is found at the end of a sufficient time to make it possible for the engine to establish itself in supercharged operation and simultaneously the accelerator is fully acted on, two solutions are possible.

Then, in a first embodiment, the driver can be informed, or the automatic operation which replaces him, that it is necessary to use a lower first gear to start under present conditions.

In a second embodiment, there can also be used a second procedure different from the first by the fact that the engine speed and the speed of the inertias linked to sun gear 17 will be allowed to increase so as to store a certain amount of movement in these inertias. When a certain engine speed and inertias linked to sun gear 17 have been reached, clutch 13 will close which will transfer these amounts of energy to the vehicle whose starting will thus be assured.

Let us examine the operation of the device during speed changes.

Any gear change comprises three phases in its execution.

The first phase is the opening of the transmission clutch to reduce to zero the torque transmitted and to make possible the disengagement of the dogs in the transmission.

This phase should be as fast as possible because it affects the total gear changing time. It is delicate for the lower gears because it releases the potential torsional energy of the axle shafts and can cause disturbing vibrations.

The second phase is the synchronization caused while the transmission is in neutral.

This phase is different according to the type of gear change executed.

Gear advancement: it is necessary to engine brake the input shaft of the transmission.

Gear downshifting: it is necessary to accelerate the input shaft of the transmission.

The third phase is the closing of the transmission to reestablish the engine torque as quickly as possible but without discontinuity that can excite in oscillations the transmission and generate uncomfortable longitudinal accelerations of the vehicle.

The opening phase of the transmission or the phase of braking the transmitted torque, always begins with the opening of bridging clutch 28 which is a very quick operation.

The torsional vibrations will be quickly damped by the internal frictions of the engine.

It is completed by finding the neutral position of the transmission obtained by physical detectors or computations.

The synchronization phase exhibits two cases:

In the case of gear advancement, at the same time as the order is given to open bridging clutch 28, the cutting of injection and the closing of the brake on the exhaust is controlled. The sequencing of these orders obviously being conceived while taking into consideration the pure delays pertaining to each action and the reduction to zero of the torque necessary for the declutching of the engaged gear.

The time for obtaining the synchronization could be relatively short considering the slight inertia itself of the engine, the use of an exhaust brake, and the presence of a differential, which divides in two the variations of input speeds in relation to output speeds.

In the case of gear downshifting, the order sequence is then:

opening of bridging clutch 28;
upon receipt of the neutral transmission information, the downshifting occurs.

Synchronism can then be reached at the end of a relatively short time.

The closing phase of the transmission of the torque exhibits two cases.

In the case after a gear advancement, the output speed is synchronous, but the speed of rotor 21 is greater than the output speed.

If bridging clutch 28 is closed, a certain amount of movement will be brought to the vehicle which facilitates a hill acceleration.

On the other hand, on the level, there can be an uncomfortable excess of acceleration that can be moderated by cutting the injection of the engine for a short time at the moment of closing bridging clutch 28.

This assumes an automatic action capable of detecting whether the gear advancement is executed on the level or on a hill. This is not a problem for an expert system.

In the case after a downshifting, the output speed is greater than the speed of rotor 21, which has preserved the prior gear speed.

If the engine accelerates the vehicle, the speeds of rotor 21 will increase and when it is synchronous with the output speed bridging clutch 28 will be able to be closed without a problem.

If the engine decelerates the vehicle, the speed of rotor 21 will decrease and it is necessary to keep the engine accelerated to obtain synchronism with the output speed and to close bridging clutch 28.

In conclusion, in all cases the speed of rotor 21 is accelerated by the engine, it joins the output speed with the synchronism, clutch 28 can be closed without dissipation of energy or jerking, and this arrangement makes it possible to bring a simple remedy to the problems of comfort on gear downshifting (an otherwise difficult problem to solve).

The closing times of the transmission are not taken into account in the time for the gear changing because they are not phases where the transmitted torque is zero and do not thereby disturb the advance of the vehicle.

The device according to the invention therefore exhibits the following advantages:

Gear advancement: On a hill, it is possible to use the kinetic energy of rotor 21 to facilitate acceleration;

Downshifting: A solution for improving comfort without a sophisticated system;

Transmission oscillations: The engine can be used as an effective damper of these oscillations;

The eddy-current brake is not used for the synchronization;

The inertia of rotor 21 does not, by its value, directly affect operations. In a first approximation, a high value would not be troublesome.

It can also be noted that the device can be used for starting the engine by inertia. To do this, it is enough to perform the following operations:

- put the transmission in neutral;
- open clutch 28;
- start rotor 21 at a sufficient speed by an electric or auxiliary pneumatic motor;
- close clutch 28;
- the engine is then started by the inertia of clutch 28.

This is advantageous in case there is an alternator instead of the eddy-current brake, because in this case the alternator can be used as a motor for starting the inertia of clutch 28.

Because of this, the necessary power is then much less than with a conventional starter.

I claim:

1. An engine brake clutch device in a motor vehicle having an engine and a transmission, comprising:
   - a differential system placed between said engine and said transmission and mechanically coupled to said engine;
   - an electric machine mechanically coupled to an output of said differential system and comprising brake means for transforming mechanical energy into heat;
   - a clutch connected between said output of said differential system and said transmission; and
   - a control device for controlling said electric machine such that said output of said differential system is braked.

2. An engine brake clutch device according to claim 1, wherein said control device is a computer.

3. An engine brake clutch device according to claim 1, wherein said electric machine is an eddy-current brake.

4. An engine brake clutch device according to claim 1, wherein said differential system has a housing carrying planet pinions which are driven by the engine;
   - a first sun gear connected directly to said transmission's input shaft; and with a second sun gear comprising said output and connected to the electric machine by means of a clutch plate of said clutch.

5. An engine brake clutch device according to claim 3, wherein the eddy-current brake comprises:
   - an excitation alternator with an inductor mounted in a stator and a first armature mounted in a rotor with a rectifier which is fed by said armature;
   - an inductor mounted in said rotor and fed by said rectifier;
   - a second armature mounted in the stator and associated with a chamber for circulating cooling water.

6. An engine brake clutch device according to claim 5 wherein said control device acts on the power supply current of the inductor and the excitation alternator.

* * * * *